(12) United States Patent
Kane (10) Patent No.: US 8,068,230 B2
(45) Date of Patent: Nov. 29, 2011

(54) REAL-TIME MEASUREMENT OF ULTRASHORT LASER PULSES

(75) Inventor: Daniel J. Kane, Santa Fe, NM (US)

(73) Assignee: Mesa Photonics, LLC, Santa Fe, NM (US)

( * ) Notice: Subject to any disclaimer, the term of this patent is extended or adjusted under 35 U.S.C. 154(b) by 540 days.

(21) Appl. No.: 12/231,082

(22) Filed: Aug. 29, 2008

(65) Prior Publication Data

US 2010/0053629 A1  Mar. 4, 2010

(51) Int. Cl.
*G01B 9/02* (2006.01)
(52) U.S. Cl. .................................................. 356/450
(58) Field of Classification Search .................. 356/450, 356/499, 521; 250/237 G
See application file for complete search history.

(56) References Cited

U.S. PATENT DOCUMENTS

| | | | | |
|---|---|---|---|---|
| 4,792,230 A * | 12/1988 | Naganuma et al. | ............ | 356/450 |
| 5,530,544 A * | 6/1996 | Trebino et al. | ............... | 356/450 |
| 5,754,292 A * | 5/1998 | Kane et al. | .................. | 356/450 |
| 5,936,732 A * | 8/1999 | Smirl et al. | ................... | 356/453 |
| 6,008,899 A * | 12/1999 | Trebino et al. | ............... | 356/450 |
| 6,219,142 B1 * | 4/2001 | Kane | ............................ | 356/450 |
| 6,504,612 B2 * | 1/2003 | Trebino | ......................... | 356/450 |
| 6,611,336 B1 * | 8/2003 | Walmsley et al. | ............ | 356/450 |
| 6,633,386 B2 * | 10/2003 | Walmsley et al. | ............ | 356/450 |
| 7,130,052 B1 * | 10/2006 | Kane | ............................ | 356/450 |
| 7,230,715 B2 * | 6/2007 | Li | ................................. | 356/450 |
| 7,450,239 B2 * | 11/2008 | Uehara et al. | ................. | 356/451 |
| 7,839,485 B2 * | 11/2010 | Shibazaki | ....................... | 355/53 |

* cited by examiner

*Primary Examiner* — Michael A Lyons
*Assistant Examiner* — Scott Richey (57) ABSTRACT

A real-time FROG system provides ultra fast pulse measurement and characterization. The system includes direct, integrated feedback that measures how well the system is retrieving pulses and tracking changes in the pulse train. This feedback is provided in real time and may be in the form of the FROG trace error, the display of the measured and retrieved FROG trace, accuracy of background subtraction or other quality measurement. The system includes preprocessing options that can be used to adjust the dynamic range of the measured signal or to perform different types of filtering. The preprocessing of the FROG trace precedes phase retrieval processing and improves the quality of pulse retrieval.

17 Claims, 10 Drawing Sheets

REAL-TIME MEASUREMENT OF ULTRASHORT LASER PULSES

BACKGROUND

1. Field of the Invention

The present invention relates to a method and apparatus for the real-time measurement of ultrashort laser pulses based on frequency-resolved optical gating (FROG).

2. Related Art

Ultrashort optical pulses have very short time durations, typically less than a few 10's of picoseconds. As a result, ultrashort optical pulses are spectrally broad. Because the index of refraction of materials is a function of wavelength, different wavelengths of light travel at different speeds in optical materials causing the properties of ultrashort optical pulses to change as they propagate. The shape of the pulse can influence how the pulse itself interacts with materials, further complicating the analysis of ultrashort optical pulse transmission and propagation. Ultrafast laser pulse measurement tries to obtain both the intensity profile of the pulse as well as the "phase of the pulse," which is the actual variation of the frequencies that make up the pulse.

Generally, time resolved measurements of events use shorter events to resolve variations in the characteristics of the events as a function of time. Unfortunately for the analysis of ultrashort optical pulses, shorter events do not exist and modern electronics are insufficiently fast to allow for direct time resolved measurements. One effective measurement technique for ultrashort optical pulses is called "frequency-resolved optical gating" or FROG. FROG is based on the observation that an optically formed spectrogram contains all of the information about the pulse to be measured. A two-dimensional phase retrieval process extracts the pulse from its spectrogram. One disadvantage of frequency-resolved optical gating is the large amount of data required to obtain all of the information needed to measure the pulse. In addition, data is needed both as a function of time and frequency (or wavelength). Aspects of the present invention improve data acquisition for FROG allowing the technique to be more versatile while retaining convenience, accuracy and speed.

Mathematical Representation of an Optical Pulse

The mathematical representation of ultrashort optical pulses is discussed to provide background for the discussion of the FROG technique. The time-dependent variations of an optical pulse are embodied in the pulse's electric field, A(t), which can be written:

$$A(t) = Re[E(t)e^{i\omega_0 t}] \quad (1)$$

where $\omega_0$ is the carrier frequency and Re refers to the real part. A(t) can be used in this form for calculations, but it is generally easier to work with a different representation that removes the rapidly varying $\omega_0$ part, $e^{i\omega_0 t}$, and uses as a representation a slowly varying envelope together with a phase term that contains only the frequency variations. This representation, which does not include the rapidly varying carrier frequency, is $$E(t) = [I(t)]^{1/2} e^{i\phi(t)} \quad (2)$$

where I(t) and $\phi$(t) are the time-dependent intensity and phase of the pulse. (E(t) is complex.) The frequency variation, $\Omega$(t), is the derivative of $\phi$(t) with respect to time:

$$\Omega(t) = -d\phi(t)/dt \quad (3)$$

The pulse field can be written equally well in the frequency domain by taking the Fourier transform of equation 2:

$$\tilde{E}(\omega) = [\tilde{I}(\omega)]^{1/2} e^{-i\phi(\omega)} \quad (4)$$

where $\tilde{I}(\omega)$ is the spectrum of the pulse and $\phi(\omega)$ is its phase in the frequency domain. The spectral phase contains time versus frequency information. That is, the derivative of the spectral phase with respect to frequency yields the time arrival of the frequency, or the group delay.

Obtaining the intensity and phase, I(t) and $\phi$(t) (or $\tilde{I}(\omega)$ and $\phi(\omega)$) is called full characterization of the pulse. Common phase distortions include linear chirping, where the phase (either in the time domain or frequency domain) is parabolic. When the frequency increases with time, the pulse is said to have positive linear chirp; negative linear chirp is when the high frequencies lead the lower frequencies. Higher order chirps are common, but for these, differentiation between spectral and temporal chirp is required because spectral phase and temporal phase are not interchangeable.

Frequency-Resolved Optical Gating

Figure 1:
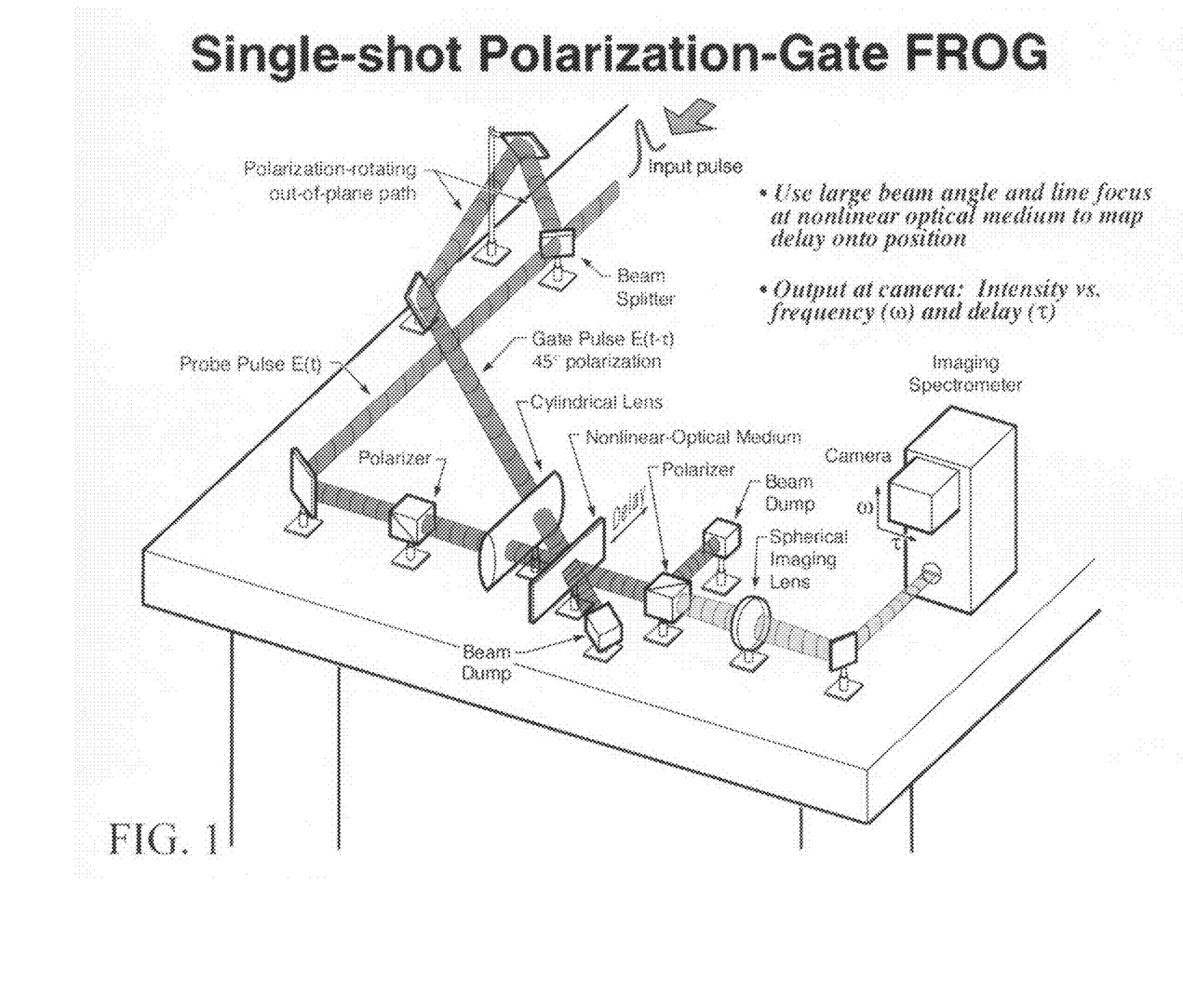
FIG. 1 illustrates that measuring the spectrogram of a pulse is easier than measuring its sonogram. A spectrogram is a spectrally resolved autocorrelation. In this figure, the optical Kerr-effect is used (polarization-gate) as the non-linearity.

Frequency-resolved optical gating (FROG) measures the spectrum of a particular temporal component of an optical pulse, shown in FIG. 1, by spectrally resolving the signal pulse in an autocorrelation-type experiment using an instantaneously responding nonlinear medium. As shown in FIG. 1, FROG involves splitting a pulse and then overlapping the two resulting pulses in an instantaneously responding $X^{(3)}$ or $X^{(2)}$ medium. Any medium that provides an instantaneous nonlinear interaction may be used to implement FROG. Perhaps the most intuitive is a medium and configuration that provides polarization gating.

For a typical polarization-gating configuration, induced birefringence due to the electronic Kerr effect is the nonlinear-optical interaction. The "gate" pulse causes the $X^{(3)}$ medium, which is placed between two crossed polarizers, to become slightly birefringent. The polarization of the "gated" probe pulse (which is cleaned up by passing through the first polarizer) is rotated slightly by the induced birefringence allowing some of the "gated" pulse to leak through the second polarizer. This is referred to as the signal. Because most of the signal emanates from the region of temporal overlap between the gate pulse and the probe pulse, the signal pulse contains the frequencies of the "gated" probe pulse within this overlap region. The signal is then spectrally resolved, and the signal intensity is measured as a function of wavelength and delay time $\tau$. The resulting trace of intensity versus delay and frequency is a spectrogram, a time- and frequency-resolved transform that intuitively displays the time-dependent spectral information of a waveform.

The resulting spectrogram can be expressed as:

$$S_E(\omega, \tau) = \left| \int_{-\infty}^{\infty} E(t) g(t - \tau) e^{-i\omega t} dt \right|^2 \quad (9)$$

where E(t) is the measured pulse's electric field, g(t−τ) is the variable-delay gate pulse, and the subscript E on $S_E$ indicates the spectrogram's dependence on E(t). The gate pulse g(t) is usually somewhat shorter in length than the pulse to be measured, but not infinitely short. This is an important point: an infinitely short gate pulse yields only the intensity I(t) and conversely a CW gate yields only the spectrum I($\omega$). On the other hand, a finite-length gate pulse yields the spectrum of all of the finite pulse segments with duration equal to that of the gate. While the phase information remains lacking in each of these short-time spectra, having spectra of an infinitely large set of pulse segments compensates this deficiency. The spectrogram nearly uniquely determines both the intensity I(t) and phase $\phi$(t) of the pulse, even if the gate pulse is longer than the pulse to be measured. If the gate is too long, sensitivity to noise and other practical problems arise.

In FROG, when using optically induced birefringence as the nonlinear effect, the signal pulse is given by:

$$E_{sig}(t,\tau) \propto E(t)|E(t-\tau)|^2 \qquad (10)$$

So the measured signal intensity $I_{FROG}(\omega,\tau)$, after the spectrometer is:

$$I_{FROG}(\omega,\tau) = \left| \int_{-\infty}^{\infty} E(t)|E(t-\tau)|^2 e^{-i\omega t} dt \right|^2 \qquad (11)$$

The FROG trace is thus a spectrogram of the pulse E(t) although the gate, $|E(t-\tau)|^2$, is a function of the pulse itself.

Figure 2:
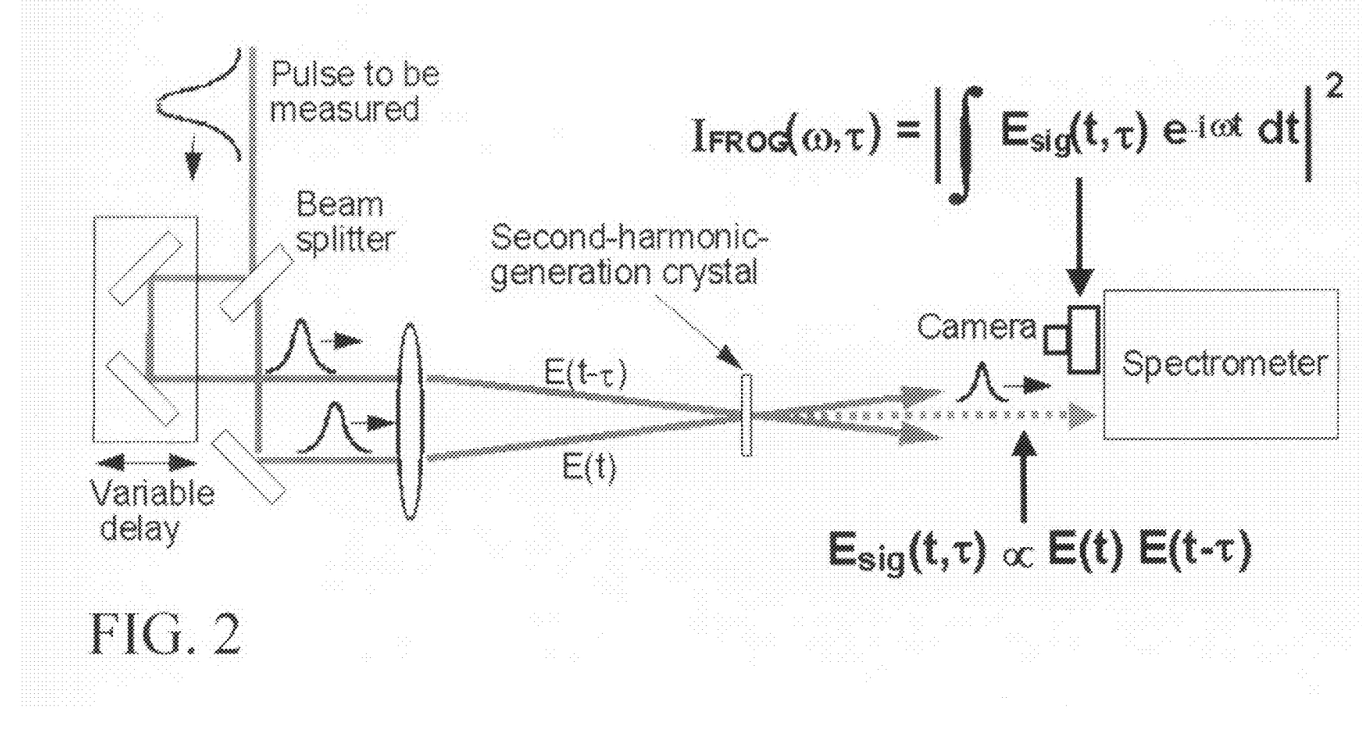
FIG. 2 shows schematically an SHG FROG device. The SHG signal from the autocorrelation is spectrally resolved. SHG FROG is very simple and sensitive, but has a direction-of-time ambiguity. For example, if the pulse has chirp, SHG FROG determines only the magnitude of the chirp and the sign of the chirp remains unknown.

FROG is not limited to the optical Kerr effect. Second harmonic generation (SHG) FROG can be constructed to analyze relatively weak pulses from oscillators and is typically more sensitive than polarization-gating FROG. For SHG FROG, the pulse is combined with a replica of itself in an SHG crystal as illustrated in FIG. 2.

To see that the FROG trace essentially uniquely determines E(t) for an arbitrary pulse, note that E(t) is easily obtained from $E_{sig}(t,\tau)$. Equation (11) can then be written in terms of $E_{sig}(t,\Omega)$, the Fourier transform of the signal field $E_{sig}(t,\tau)$ with respect to delay variable $\tau$. This gives the following, apparently more complex, expression:

$$I_{FROG}(\omega,\tau) = \left| \int_{-\infty}^{\infty} E_{sig}(t,\Omega) e^{-i\omega t - i\Omega\tau} dt d\Omega \right|^2 \qquad (12)$$

Equation (12) indicates that the problem of inverting the FROG trace $I_{FROG}(\omega, \tau)$ to find the desired quantity $E_{sig}(t,\tau)$ is that of inverting the squared magnitude of the two-dimensional (2-D) Fourier transform of $E_{sig}(t, \tau)$. This problem, which is called the 2-D phase-retrieval problem, is well known in many fields, especially in astronomy, where the squared magnitude of the Fourier transform of a 2-D image is often measured. At first glance, this problem appears unsolvable; after all, much information is lost when the magnitude is taken. The 1-D phase retrieval problem is known to be unsolvable (for example, infinitely many pulse fields give rise to the same spectrum). Intuition fails badly in this case, however. Two- and higher-dimension phase retrieval processes essentially always yield unique results.

FROG Inversion

Figure 3:
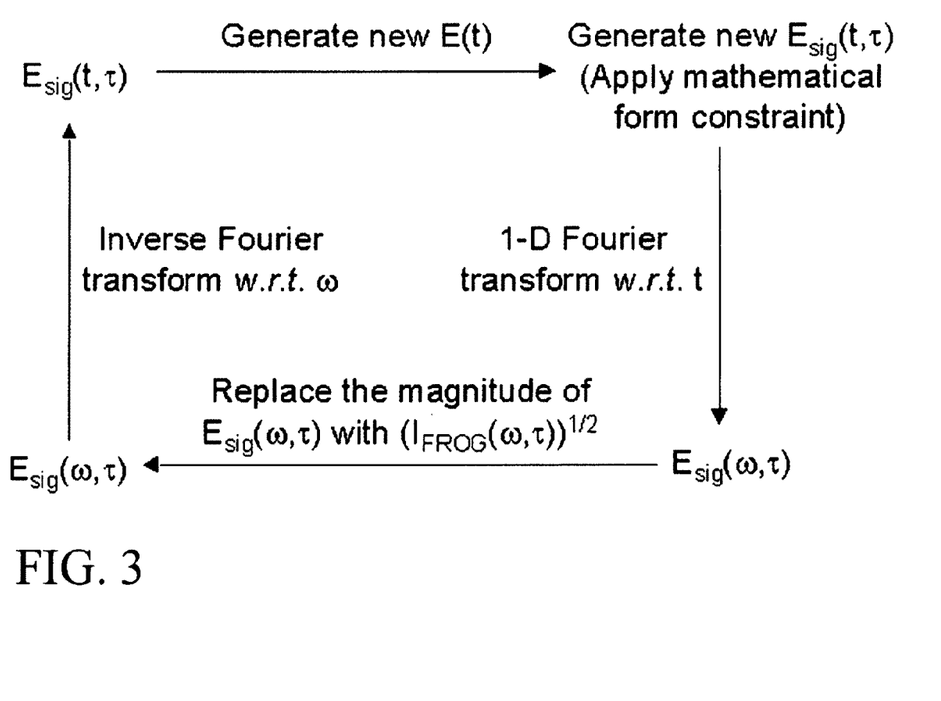
FIG. 3 illustrates the phase retrieval processes for the inversion of FROG spectrograms that start with an initial guess for the pulse to generate an initial $E_{sig}(t,\tau)$. A one dimensional Fourier transform generates the FROG trace. The process continues by replacing the magnitude of the calculated FROG trace with the square root of the measured FROG trace. The process takes the inverse Fourier transform with respect to $\omega$ to produce the new signal field and generate a new start value for $E(t)$. It is only the process that produces $E(t)$ from $E_{sig}(t,\tau)$ that differentiates the various FROG implementations.

An iterative 2-D phase retrieval process is used to extract the pulse information from the measured FROG trace as illustrated generally in FIG. 3. This phase retrieval process converges to a pulse that minimizes the difference between the measured and the calculated FROG trace. Application of this phase retrieval process to FROG has been problematic in the past. Some recent applications use a generalized projections algorithm, which converges quickly, along with faster computers, to track pulse changes at rates of 20 Hz or greater, making FROG a real-time pulse measurement technique. Indeed, programs for analyzing FROG traces are commercially available.

The original FROG inversion process, using what is commonly referred to as the vanilla algorithm, is simple and iterates quickly. On the other hand, the process tends to stagnate and give erroneous results, especially for geometries that use a complex gate function such as SHG or self-diffraction. Improved strategies using different algorithms, including brute force minimization, were developed to avoid stagnation, at the expense of both iteration speed and convergence time. Later a numerical technique called generalized projections brought a significant advance in both speed and stability. The generalized projections technique proceeds after an iteration by constructing a projection that minimizes the error (distance) between the FROG electric field, $E_{sig}(t, \tau)$, obtained immediately after the application of the intensity constraint, and the FROG electric field calculated from the mathematical form constraint. The projection constructed in this manner is used as the starting point of the next iteration.

The first implementations of the generalized projections technique used a standard minimization procedure to find the electric field for the next iteration (which can still be slow). For the most common FROG geometries, PG and SHG, there are substantial advantages to a different strategy that directly determines the starting point for the next iteration. This strategy, called Principal Components Generalized Projections (PCGP), converts the generalized projections technique into an eigenvector problem. The PCGP technique has achieved pulse characterization rates of 20 Hz.

The goal of phase retrieval is to find the E(t) that satisfies two constraints. The first constraint is the FROG trace itself which is the magnitude squared of the 1D Fourier transform of $E_{sig}(t,\tau)$:

$$I_{FROG}(\omega,\tau) = \left| \int_{-\infty}^{\infty} E_{sig}(t,\tau) e^{-i\omega t} dt \right|^2 \qquad (13)$$

The other constraint is the mathematical form of the signal field, $E_{sig}(t,\tau)$, for the nonlinear interaction used. The mathematical forms for a variety of FROG beam geometries are:

$$E_{sig}(t,\tau) \propto \begin{cases} E(t)|E(t-\tau)|^2 & PG\ FROG \\ E(t)^2 E^*(t-\tau) & SD\ FROG \\ E(t)E(t-\tau) & SHG\ FROG \\ E(t)^2 E(t-\tau) & THG\ FROG \end{cases} \qquad (14)$$

where PG is polarization gate, SD is self-diffraction, SHG is second harmonic generation and THG is third harmonic generation FROG.

All FROG implementations work by iterating between two different data sets: the set of all signal fields that satisfy the data constraint, $I_{FROG}(\omega,\tau)$, and the set of all signal fields that satisfy equation 14. The difference between FROG implementations is how the iteration between the two sets is completed. In the case of generalized projections, the E(t)'s are chosen such that the distance between the E(t) on the magnitude set and the E(t) on the mathematical form set is minimized. This is accomplished by minimizing the following equation:

$$Z = \sum_{i,j=1}^{N} |E_{sig(DC)}^{(k)}(t_i,\tau_j) - E_{sig(MF)}^{(k+1)}(t_i,\tau_j)|^2 \qquad (15)$$

where $E_{sig(DC)}^{(k)}(t_i,\tau_j)$ is the signal field generated by the data constraint, and $E_{sig(MF)}^{(k+1)}(t_i,\tau_j)$ is the signal field produced from one of the beam geometry equations 14. For the normal generalized projections technique, the minimization proceeds using a standard steepest decent algorithm; the derivative of Z with respect to the signal field is computed to determine the direction of the minimum. The computation of the derivatives is tedious; the derivatives are tabulated in, for example, Trebino, et al., *Rev. Sci Instrum.*, 68, p. 3277 (1997).

An alternative to the minimization of equation 15 is principal components generalized projections (PCGP). PCGP computes the starting point of the next iteration through an eigenvector problem, reducing the computation for the next iteration to simple matrix-vector multiplies. PCGP works for both the PG and SHG beam geometries, is simple to program and is fast, as described in D. J. Kane, *IEEE J. Quant. Elec.*, (1999).

Self Checks in FROG Measurements

Unlike other pulse measurement techniques, FROG can provide a great deal of feedback about both the quality of the measurement (systematic errors) and the quality of the technique's performance. A good check for convergence is the FROG trace error together with a visual comparison between the retrieved FROG trace and the measured FROG trace. The FROG trace error is given by:

$$G = \sqrt{\frac{1}{N^2} \sum_{i,j=1}^{N} |I_{FROG}(\omega_i, \tau_j) - \alpha I_{FROG}^{(k)}(\omega_i, \tau_j)|^2} \quad (16)$$

where α is a renormalization constant, $I_{FROG}$ is the measured FROG trace and $I_{FROG}^{(k)}(\omega, \tau)$ is computed from the retrieved electric field. Typically, the FROG trace error of a PG measurement should be less than 2% for a 64×64 pixel trace, while the FROG trace error of a 64×64 pixel SHG FROG trace should be about 1% or less. Acceptable FROG trace errors decrease as FROG trace size increases and increase for smaller FROG traces. These values are only guidelines and variations are expected in specific circumstances. For example, acceptable phase retrievals of large and very complicated FROG traces can produce larger FROG trace errors.

In a good FROG measurement, the spectrum of the retrieved pulse should faithfully reproduce the salient features of the pulse's measured spectrum. SHG FROG even provides an additional check called the frequency marginal. The sum of an SHG FROG trace along the time axis yields the autoconvolution of the pulse's spectrum providing two ways the FROG measurement can be checked. First, the autoconvolution of an independently measured spectrum can be compared to the sum of the FROG trace along the time axis (the frequency marginal) providing an indication of how well the measurement was made. For example, if the doubling crystal was too thick in the pulse measurement, the FROG trace's frequency marginal will be narrower than the autoconvolution of the measured spectrum. Second, comparing the autoconvolution of the retrieval pulse spectrum with the FROG trace marginal can provide a test of convergence in addition to a test of the measurement. Phase matching problems show up as a mismatch between the FROG trace marginal and the autoconvolution of the retrieved spectrum.

Because FROG is a spectrally resolved autocorrelation, summing any FROG trace along the frequency axis yields the autocorrelation of the measured pulse. This autocorrelation can be compared to an independently measured autocorrelation, or a comparison can be made between the frequency sum of the FROG trace and the autocorrelation calculated from the retrieved pulse to determine algorithm convergence and the quality of the measurement.

Making FROG Real-Time

In order to make FROG a real-time pulse measurement technique, the FROG device, the data acquisition, the 2-D phase retrieval process, and the user interface are integrated. One real-time ultrashort laser pulse measurement implementation combined a multishot FROG device with two digital signal processing (DSP) boards in a fast personal computer. This implementation is described in D. J. Kane, *IEEE J. Quant. Elec.*, (1999). One DSP card was devoted to data acquisition and the other DSP card was used to make the calculations. Briefly, as an optical delay line was scanned, the signal from the nonlinear interaction was spectrally resolved. Thus, temporal slices of the FROG trace, or spectrogram were obtained. Appropriate (sequential) ordering and assembly of the temporal slices formed the FROG trace.

The DSP implementation was considered expensive for some applications and so efforts were directed to develop a FROG-based ultrashort laser pulse measurement that did not use DSP cards. One implementation that did not use a DSP, called VideoFROG, used a standard CCD video camera to acquire the FROG trace and a standard computer frame grabber to digitize the video signal. The computer displayed the resulting FROG trace and resized and conditioned the FROG trace for the phase retrieval process. The computer also was the user interface, displaying the retrieved pulse and the raw video image. VideoFROG used the PCGP phase retrieval process, which generally converges well. Consequently, no provision was made to detect stagnation or other faults in the phase retrieval process.

Basic Controllers—Proportional Integral Derivative Control

The simplest and fastest controller is just the basic proportional controller. However, these most basic controllers are prone to calibration errors and offsets. The measured difference will not correspond to the actual difference and the pulse will never achieve the desired pulse shape—the system will have a steady-state error in the set point (Dorf and Bishop, *Modern Control Systems*, p. 193)

Figure 4:
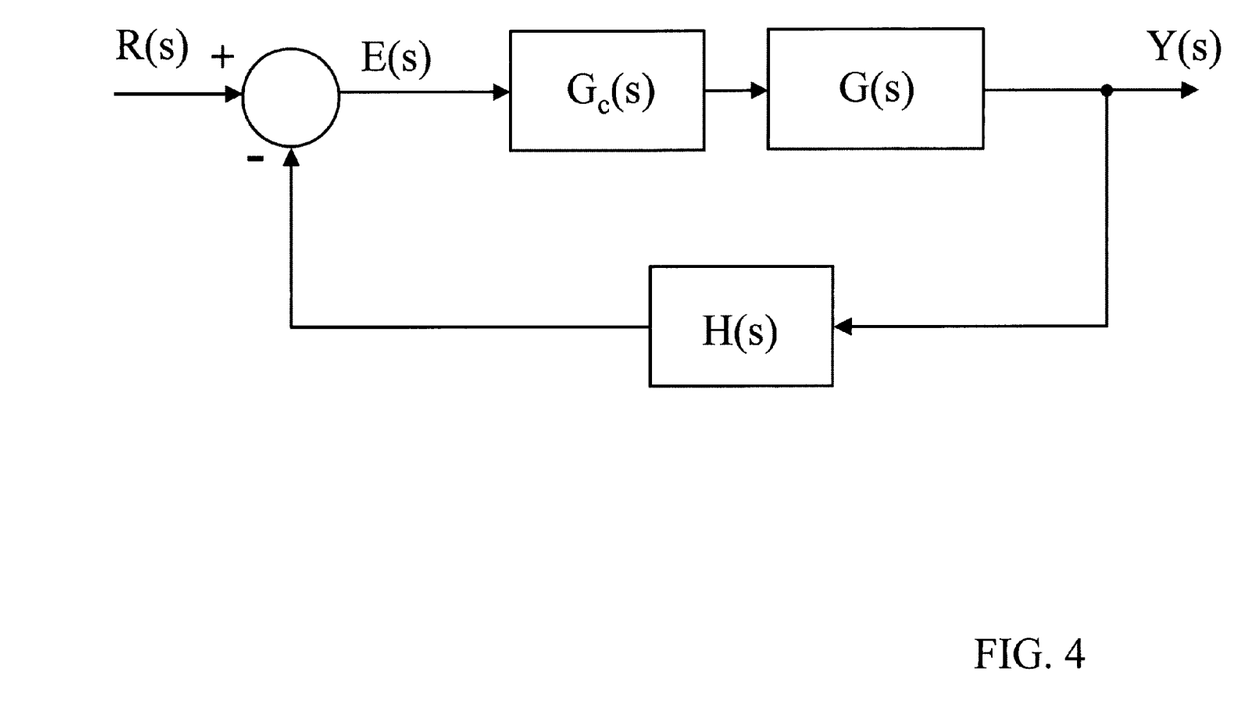
FIG. 4 shows a block diagram of a closed loop control system. $R(s)$ is the transfer function for the input; $E(s)$ is the transfer function for the error; $G_c(s)$ is the transfer function for the controller; G(s) is the transfer function for the device; and H(s) is the transfer function for the encoder.

A simple calculation illustrates this effect. The schematic shown in FIG. 4 depicts a typical control loop. Suppose R(s) is the transfer function (Laplace transform) for the input to the pulse shaper, Y(s) is the transfer function for the output, E(s) is the transfer function for the error, $G_c(s)$ is the controller transfer function, G(s) is the transfer function of the servo itself, and H(s) is the transfer function for the position encoder or sensor. The output of the system is given by (Dorf and Bishop, *Modern Control Systems*, p. 178-180):

$$Y(s) = \frac{G_c(s)G(s)}{1 + G_c(s)G(s)H(s)} R(s) \quad (17)$$

The error of the system, which is the difference between the measured pulse and the desired pulse (R(s)), is given by (Dorf and Bishop, *Modern Control Systems*, p. 183):

$$E(s) = \frac{1}{1 + G_c(s)G(s)H(s)} R(s) \quad (18)$$

For purposes of an example, in the case of proportional control only, suppose we set $G_c(s)=K$, $H(s)=1$ and $G(s)=1$ (ideal case). Thus, $$E(s) = \frac{1}{1+K} R(s) = \frac{1}{1+K} \frac{1}{s} \quad (19)$$

when the input is a unit step function ($R(s)=1/s$). To calculate the steady state error, we use the final-value theorem (Dorf and Bishop, *Modern Control Systems*, p. 183) which is:

$$\lim_{t \to \infty}(e(t)) = \lim_{s \to 0}(sE(s)) \quad (20)$$

where $E(s)$ is the Laplace transform of $e(t)$. Thus, we find that the steady-state value of the error, $e(t)$ is $1/(1+K)$.

Therefore, a simple proportional feedback control system is unacceptable for the level of precision and accuracy required by ultrafast laser pulse measurement.

One way to address all of the control issues is to include terms in addition to the proportional feedback term. For example, an integral term will remove steady-state errors. An integral controller has a transfer function of (Dorf and Bishop, *Modern Control Systems*, p. 703):

$$G_c(s) = K_p + \frac{K_I}{s} \quad (21)$$

where $K_I$ is the integral gain term. Setting $G(s)$ and $H(s)$ to 1 and solving for $E(s)$, we get:

$$E(s) = \frac{s}{K_p s + K_I} \frac{1}{s} \quad (22)$$

Figure 5:
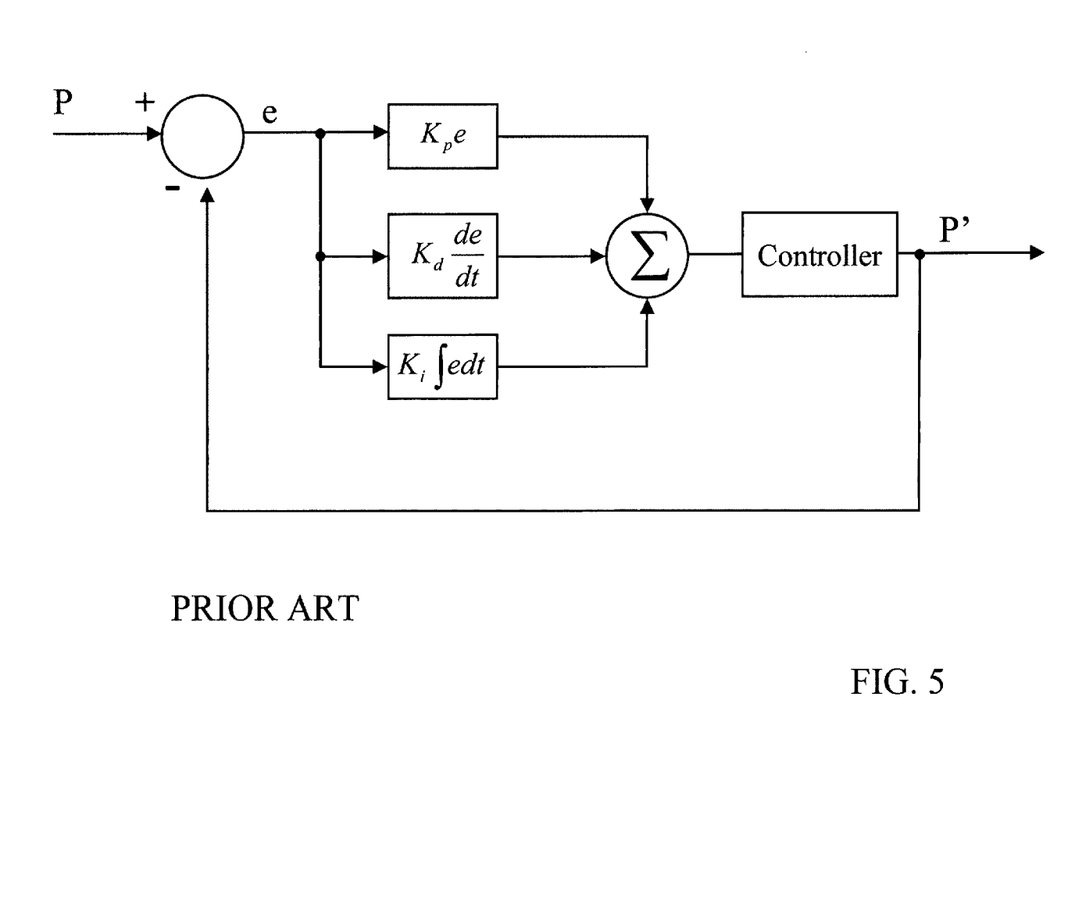
FIG. 5 shows schematically a proportional-integral-derivative controller. Subtracting the actual position of the device from the desired position produces an error signal that is processed. As illustrated, the sum of the error signal (proportional), the integral of the error signal and derivative of the error signal form the control signal.

Applying the final-value theorem as mentioned above, we find that as $t \to \infty$, the offset (error), $e(t) \to 0$. Unfortunately, the addition of an integral term does come at a cost—a reduction of the transient response and an increase in the overshoot. A derivative term is usually added to improve transient response, decrease overshoot, and decrease the settling time. Thus, the simplest form of a robust, high precision, high accuracy controller with good speed is the proportional-integral-derivative, or PID, controller (FIG. 5):

SUMMARY OF THE PREFERRED EMBODIMENTS

A preferred implementation may include a real-time pulse measurement device that uses a servo with a high accuracy position detector that is also high-speed integrated into the control of the servo. Feedback that measures how well the device is retrieving pulses and tracking changes in the pulse train may be used to monitor the performance of the servo delay line. This feedback may be in the form of the FROG trace error, the display of the measured and retrieved FROG trace, or another display or algorithm that can be used to provide information about the quality of the measurement.

According to one aspect, the present invention may provide a method for real-time measurement of ultrashort laser pulses comprising a servo with a high accuracy position detector integrated into the control of the servo, recording in a computer measured frequency resolved optical gating (FROG) trace data, the FROG trace data generated by processing a pulse in a multishot FROG device. The method continues by processing the measured FROG trace to perform real time phase retrieval and to generate in real time a retrieved pulse from the measured FROG trace. The retrieved pulse is displayed.

According to another aspect, the present invention may provide a method of performing real time phase retrieval processing of frequency resolved optical gating (FROG) traces. The method comprises a servo with a high accuracy position sensor integrated into the control of the servo to provide a set of optical delays, receiving as input a measured FROG trace data set, the FROG trace data set generated by processing a pulse in a FROG device and processing the measured FROG trace data set to perform real time phase retrieval and generating in real time a retrieved pulse from the measured FROG trace. Displays of the retrieved pulse are preferably generated at a rate of one Hertz or faster.

A method of performing real time phase retrieval processing of frequency resolved optical gating (FROG) traces, the method comprising receiving as input a measured FROG trace data set created by processing a pulse in a FROG device that uses a servo controlled optical delay; the servo implementing a high accuracy position encoder into the control of said servo to provide a set of optical delays. The method includes processing the measured FROG trace data set to perform real time phase retrieval and generating in real time a retrieved pulse from the measured FROG trace. Real time displays are generated of the retrieved pulse. The method may also include generating in real time a feedback parameter providing information characterizing the performance of the servo optical delay line and performing a control operation in response to the feedback parameter.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention.

DETAILED DESCRIPTION OF THE PREFERRED EMBODIMENTS

Preferred embodiments of the present invention provide a real-time ultrafast laser pulse measurement method and apparatus. Aspects of the present invention may provide improved pulse measurement speed, improved accuracy of scanning frequency-resolved optical gating (FROG) or reduce the cost of multishot FROG devices. In some implementations, all of these advantages can be achieved. Particularly preferred implementations use servo translation stages that incorporate high accuracy position encoders to create a scanning optical delay for the measurement system based on frequency-resolved optical gating. Some embodiments of the present invention preferably use servos with the position sensitive detection contained within the control loop for better and more accurate time delays. Other aspects of the present invention preferably use optical position sensitive detectors as the high accuracy position encoder. Even other aspects of the invention incorporate further processing of the FROG data to provide real-time pulse measurement. Additional aspects use feedback to determine if the FROG trace data has been obtained with good fidelity.

Single-shot versions of a FROG device tend to have limited wavelength resolution and a limited time span over which the device can be used. This can be problematic when trying to measure highly chirped or structured pulses that are both spectrally broad and temporally broad. This is especially problematic in the GRENOUILLE device design as described in U.S. Pat. No. 6,504,612 to Trebino. In addition, because of blurring effects in GRENOUILLE devices, the accuracy of the pulse measurement is reduced. Nevertheless, because of cost and ease of data acquisition, single-shot, GRENOUILLE devices have been a prevalent design for commercial FROG pulse measurement systems. Preferred scanning designs may include an optical delay that is scanned either mechanically or electronically and the optical delay may have adjustable optical delay ranges. Therefore, they can overcome the limited, fixed time span of single shot FROG devices where the time delay is mapped onto a spatial coordinate (e.g., U.S. Pat. No. 6,504,612 to Trebino). Preferably, scanning systems are responsive and provide real time measurements and output. Typical designs avoid the use of stepper motor delay stages to scan the delay between the pulse replicas.

Conventional scanning designs for FROG have been expensive because they use a servo delay stage. Such servo delay stage scanning FROG systems can be elegant, allowing the pulse delay to be changed very quickly. The greatest limitation to these types of delay stages has been the encoder used. A linear variable differential transformer (LVDT) is one type of position sensor. Hall effect sensors, capacitive sensors, as well as other types of sensors are also known. However, few, if any, have the accuracy and precision required to measure extremely short pulses, as short, or shorter than about fifty femtoseconds. Indeed, ultrafast laser pulse measurement systems must routinely be able to measure pulses that are ten femtoseconds or less in length. In the prior implementation of the scanning real-time FROG device, the accuracy of the servo could not reliably measure pulses as short as ten femtoseconds.

Voice coils have been used in delay stages for ultrashort laser pulse measurement in FROG devices, autocorrelators, and other pulse measurement devices. Utilizing "shakers" or speakers, voice coil delay stages have not incorporated position sensors to linearize the position via closed loop control of the voice coil. Typically, voice coil (in addition to other types of linear motors) speakers have been implemented using a known trigger point, such as an end point in the scan, and assuming a position versus time relationship. This has two disadvantages. First, the position is not known to the precision required to measure pulses from very short wavelength lasers; second, the linear motor is constantly moving. Therefore, when using an integrating CCD array for data capture, the time delay between the two beams is smeared, which degrades the data. Worse, because the stage is not moving at a constant velocity and instead has a sinusoidal velocity, different spectral slices of the measurement exhibit different amounts of smearing. Furthermore, these systems tend to drift in center delay, causing the FROG trace to move, which degrades the retrieval. While suitable for longer pulses (>50 fs), such a method is not suitable for measuring shorter pulses.

By having high precision position feedback in the form of a highly accurate position encoder incorporated into control of the servo stage that provides the optical delay in the FROG device, preferred implementations of the present invention can avoid undesirable artifacts such as time smearing and resolution changes. Aspects of the invention may be implemented to additionally improve accuracy and speed. Preferably, the servo stage is implemented to allow the position to be known precisely; step scan data acquisition can be utilized to reduce or eliminate time smearing. In addition, the highly accurate position encoder allows the scan to be linearized, which improves the calibration and maintains position and tracks information well, improving the stability of the calibration.

Integrated optical position sensitive sensors provide high accuracy position encoders directly coupled into the control and/or feedback loops of the servo drive and are useful in implementing aspects of the present invention, providing performance at a practical cost for many systems. Optical position sensitive detectors provide a signal based on the position of an optical beam on the sensor, with the signal proportional to the centroid of the beam. Thus, as long as the beam shape does not change, the recorded position remains accurate and consistent. Low noise and high accuracy electronics are preferably used to monitor the position of the beam on the sensor.

Optically based position sensitive detectors have saturation currents on the order of 30 uA and dark currents of ~0.02 nA. Thus, it is possible to have resolutions on the order of 1 part in 600,000 so that a ten millimeter position sensitive detectors can theoretically provide resolutions as high as seventeen nanometers. The intrinsic bandwidth of such detectors, as determined by the capacitance and the internal resistance, can be on the order of 500 kHz. Positional error can be improved by fitting techniques.

Servos incorporating this type of position sensor can have response times in the millisecond range with position accuracies to better that 200 ppm with precisions on the order of 150 nanometers. Such a system is well suited for pulse measurement devices that require better than one femtosecond in time delay between the two beams. For example, in previous real-time DSP implementations of FROG, a servo with a capacitive sensor was used to monitor the position of servo for closed loop control (U.S. Pat. No. 7,130,052). Even at modest update rates (2 Hz), the servo could not track the desired position to the accuracy required by current pulse measurement systems largely because of the inaccuracies and the lack of bandwidth (limited response time) of the capacitive sensor used.

Figure 6:
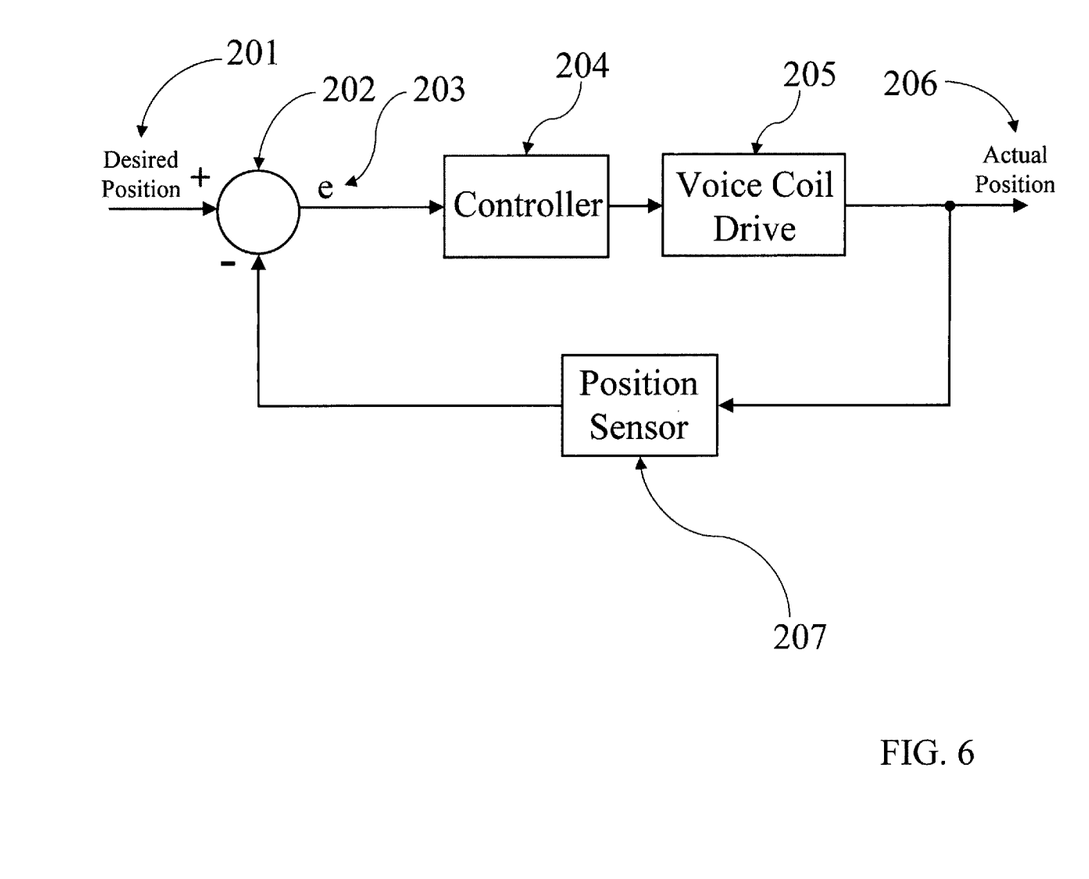
FIG. 6 shows schematically the control loop of a voice coil translator. A controller controls the servo position while a position sensor, such as an optical position sensitive detector, determines the position of the servo. The measured position is subtracted from the desired position to form the error signal to be fed into the controller.

FIG. 6 shows an exemplary implementation of the control loop for a servo delay line preferably used in an exemplary implementation of this invention. The desired position 201 is input into the controller, while the actual position 206 is measured by a high accuracy position sensor 207 and subtracted from the desired position 202 to form the error signal 203. The error signal 203 is used by the controller 204 to determine the drive required to the servo (voice coil drive) 205 to obtain the desired position 201.

Because large changes can occur in the pulse even at the high retrieval rates possible using this method and apparatus, and distortions in the measured FROG trace can occur because the servo optical delay line is not tracking properly, the method and apparatus may preferably provide indications to the user regarding the performance of the optical delay line. Previous real-time pulse measurement systems utilizing an optical delay line provided no feedback to the user to indicate a problem with the optical delay line. To provide feedback to both the program and the user, certain aspects of the present invention may provide within a preferred program or interface implementation a calculated or displayed metric (or both) to indicate how well the iterative FROG process is tracking the pulse. One preferred choice and typically the simplest metric to use is the FROG trace error. High errors indicate a loss of tracking; that is, the retrieved pulse is no longer close to the true pulse. Consequently, the scanning parameters of the optical delay line are reset. A particularly preferred strategy for changing the optical delay line scanning parameter is to reduce the scan range.

As previously discussed, the FROG trace error metric is proportional to the distance measurement between the FROG trace constructed from the retrieved pulse (retrieved FROG trace) and the measured FROG trace that has been resized. Typically, if the measured FROG trace is close to the retrieved FROG trace, then the distance is small, and the phase retrieval process is tracking properly. If the distance becomes large, then the phase retrieval process may be stagnated or may no longer be consistent with good tracking of the optical delay line. The distance measurement is usually the Euclidean norm of the difference between the measured and the retrieved FROG trace, divided by N, where N is the square root of the number elements in the FROG trace. Other distance related measurements can be used as the FROG trace error metric such as the sum of the absolute value of the differences (the $l_1$ norm of the difference) or the per element average of the absolute value of the differences.

While small distances (low FROG trace errors) between the measured and retrieved FROG traces usually indicate good retrievals, they are not always a complete indicator of stagnation or a loss of tracking. These quantities are subject to interpretation. For example, retrievals from large FROG traces always have smaller errors than comparable retrievals from smaller FROG traces. This usually occurs because larger FROG traces have more elements with small values than smaller FROG traces. Also, if the FROG trace is very complex and has large amounts of structure, then the FROG trace error may be higher than for a smooth, simple FROG trace even when both FROG traces are nearly the same size. For example, an acceptable FROG trace error is in the range of 0.5%-1.5% for second harmonic generation (SHG) FROG retrievals on a 64×64 grid. But errors as high as 3.5% can still yield acceptable results. If the grid size is increased to 128× 128 then the acceptable error drops by a factor of 2. For polarization gate FROG, acceptable FROG trace errors are on the order of 2%. Again, for larger grid sizes, this value drops. Thus, the FROG trace error alone provides a guide to the quality of a retrieval, subject to appropriate interpretation.

Another way to determine if the scanning real-time FROG device is measuring pulses correctly is to visually compare the measured FROG trace with the retrieved FROG trace. When the two FROG traces are compared side-by-side, they should appear very similar. Thus, if the measured and retrieved FROG traces appear similar and the FROG trace error is low, then the retrieval is likely of good quality. If they have the same general shape and the FROG trace error is a little high, then the retrieval is probably good. If the two traces appear very different, then the retrieval is almost certainly poor, and the scanning properties of the optical delay line may need to be adjusted.

Yet another way to determine if the scanning real-time FROG device is measuring pulses correctly is to visually examine the live view of the FROG trace. Artifacts that indicate improper scanning of the optical delay line can occur such as a change in the intensity in the wings of the FROG trace during the return of the delay line to the starting position. Time smearing may also be visible. Possible mitigation strategies might be to reduce the frame rate of the FROG device, slow the scanning speed of the optical delay line, changing the scanning waveform, or filter the scanning waveform before applying it to the servo.

While it might be possible to automate such feedback and analysis, automation is quite difficult in practice. A carefully constructed neural net might be able to make a correct decision about the quality of the retrieval, but having the displays easily available for the user is presently preferred as an indication of the quality of the retrieval and, therefore, the information about the quality of the measured pulse. In addition, the displays provide the user with enough information to tell if the algorithm is no longer tracking the pulse.

Preferred implementations of this real-time pulse measurement system can measure ultrafast laser pulses in real-time at rates on the order of one Hertz, or at even faster rates such as four Hertz or faster. The method and apparatus preferably includes a multishot frequency-resolved optical gating (FROG) device that uses a servo with a high accuracy position detector (or encoder) integrated into the control of the servo, where a desirable phase retrieval process provided for ideally seamless user access. The data signal, or time slices of the FROG trace, is collected using a suitable data acquisition device such as a spectrometer interfaced to a computer. This data signal, the raw FROG trace, provides the user with an indication as to the performance of the FROG device itself. Because the raw FROG trace is a spectrogram of the pulse—a display of intensity against frequency and time, it also provides some indication as to the duration and frequency content of the pulse. To obtain the actual intensity and phase of the pulse, a two-dimensional phase retrieval algorithm is applied to the FROG trace.

To use the phase retrieval algorithm, the raw FROG trace is resized to establish the correct relationship between the time and the frequency axis such that the frequency span is equal to the inverse of the time spacing and the time span is equal to the inverse of the frequency spacing, which is the general case for Fourier transforms.

After the FROG trace is resized, it is subjected to the FROG processing. To improve the speed of the tracking of the FROG processing, the pulse retrieved from the previous FROG trace preferably is used as the initial guess for the new FROG trace. In this way, the FROG processing can be thought of as an adaptive digital filter. While the PCGP algorithm has usually been used in real-time FROG measurements, other FROG retrieval algorithms can be used as well.

Figure 7:
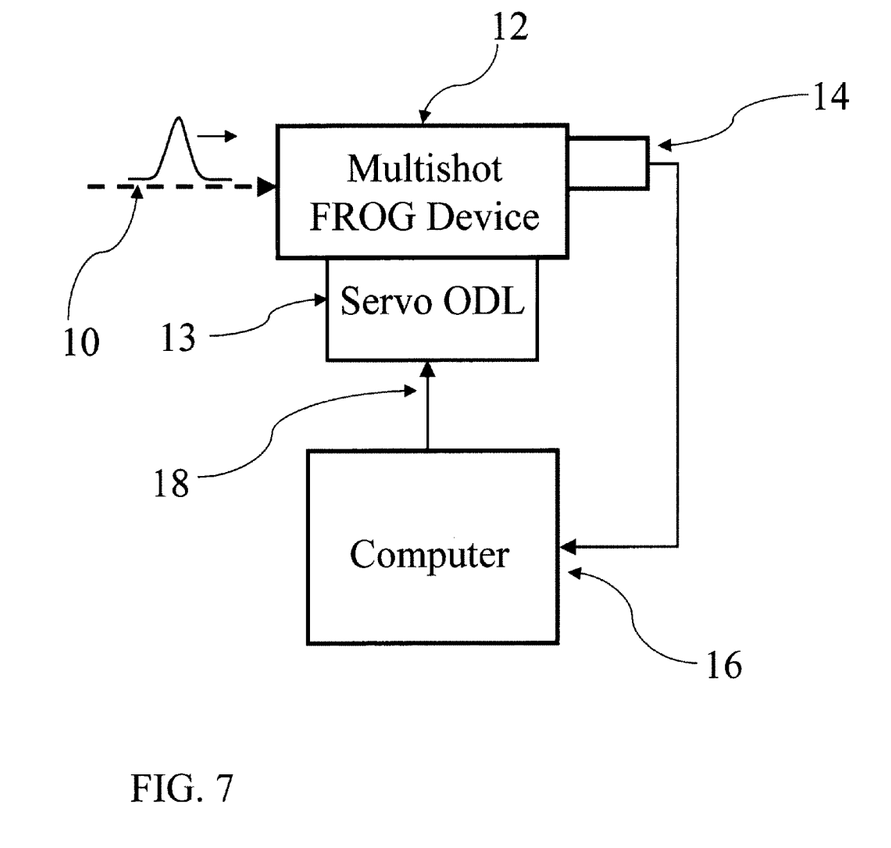
FIG. 7 is a schematic illustration of a FROG system in accordance with aspects of the present invention.

A preferred implementation of a FROG system is shown in FIG. 7. A short pulse 10, such as an ultrashort laser pulse, is sent into a multishot frequency resolved optical gating (FROG) device 12 that uses a servo-controlled, scanning optical delay line 13 to provide the preferred optical delays. The servo controller, in turn, preferably incorporates a high accuracy position encoder into its control loop. Time slices of the spectrogram output of the FROG device are recorded using a spectrometer 14. The output from the spectrometer 14 is digitized, and sent into the computer 16, where the data are analyzed and displayed for the user. The computer 16 in turn controls 18 the servo controlled optical delay line 13 to synchronize the delay with the data acquisition of the spectrometer 14. FROG processing and phase retrieval are preferably accomplished in computer 16, which preferably implements the PCGP technique described in U.S. Pat. No. 6,219,142, which is incorporated by reference in its entirety for all of its teachings related to FROG phase retrieval and FROG apparatus.

It should be appreciated that the various preprocessing and user control strategies described here are preferably implemented in conjunction with the PCGP phase retrieval technique in a FROG system. It should further be appreciated that the preprocessing and user control strategies described here can also be implemented advantageously in FROG implementations that do not use the PCGP technique. In fact, aspects of the present invention are expected to have even greater benefits in FROG implementations that do not use PCGP techniques.

Figure 8:
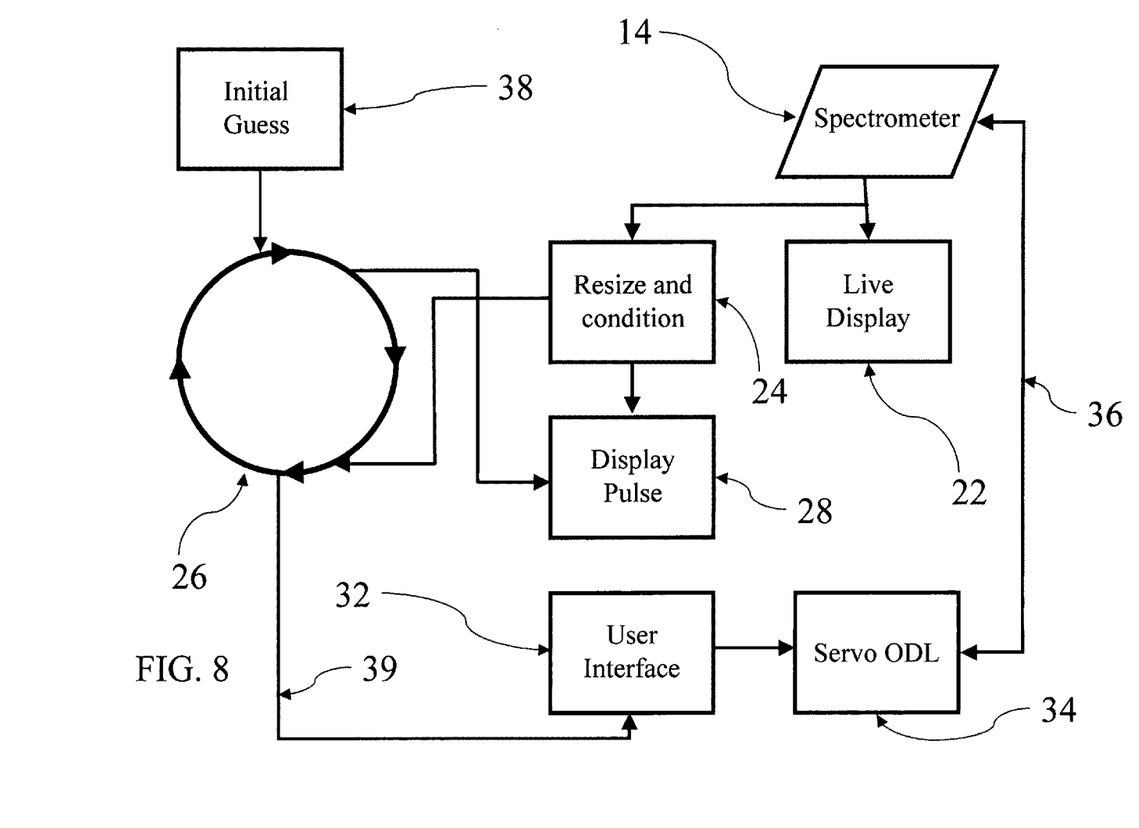
FIG. 8 illustrates the display and preprocessing of raw FROG data, along with the iterative phase retrieval process used to characterize a high-speed laser pulse. According to one preferred aspect of the present invention, the illustrated FROG system provides an indication of feedback that can be used to identify performance problems with the servo delay line. One response is user intervention to change the operating parameters of the delay line.

A preferred data acquisition and analysis process is shown in FIG. 8. FIG. 8 shows the display and preprocessing of raw FROG data, along with the iterative phase retrieval process used to characterize the pulse. According to preferred aspects of the present invention, the illustrated FROG system provides an indication of user control of the servo optical delay line (ODL) that can be used to optimize the data acquisition process for the current user needs. Data obtained by the spectrometer 14 (also shown in FIG. 7) are provided to the computer 16 (FIG. 7) for processing and display. The computer both displays 22 (FIG. 8) and conditions 24 the raw data for the iterative two-dimensional phase retrieval process 26. Prior to sending the new conditioned data 24 to the iterative retrieval process 26, the results from the previous iteration are extracted and displayed 28. The inversion process (or iterative retrieval process) 26 can also be used to provide the user with feedback about how the servo delay line 34 is operating and if it needs adjustment. Possible indications of poor performance include smearing of the live view of the FROG trace in time, mismatch between the measured and retrieved FROG traces, large FROG trace error, and also distortions in the live FROG trace view.

The user, via the user interface 32, can control the servo optical delay line (ODL) scan parameters 34. One possible option for control is to adjust the range of time delays scanned by the servo ODL. Another is to adjust the center of the scan of the ODL. Yet another is to adjust the number of spectra taken. In some cases, to increase the data acquisition speed and hence to increase the frame rate, every other spectra (or even fewer spectra) can be recorded. Interpolating between the spectra can be used to construct the FROG trace for the retrieval. In other cases, when the pulse is very complex, the grid size of the phase retrieval preferably is increased (more spectra recorded).

Another sort of action that might be taken by the user through the user interface 32 might be to suspend servo ODL movement in order to allow for alignment of the device. By holding the optical delay at one position, adjustment of the FROG device can be completed efficiently.

While the servo optical delay line (ODL) 34 and the spectrometer 14 can be operated independently or asynchronously, provided the repetition rate is high enough, it is usually more efficient to synchronize 36 the servo ODL 34 movement with the data acquisition of the spectrometer 14. This synchronization can either be accomplished in software or hardware. If the synchronization is done in software, it is preferably done by first moving the servo ODL 34, waiting for a fixed time to settle, then reading the spectrometer 14. Sometimes it is preferable to read the spectrometer 14 twice to make sure that the servo ODL 34 is not moving during the spectral acquisition. If the synchronization is done in hardware, the servo ODL 34 can either trigger the spectrometer 14 once the servo ODL 34 has settled or the spectrometer 14 can trigger the servo ODL 34. It is presently preferred to have the servo ODL 34 trigger the spectrometer 14.

Figure 9:
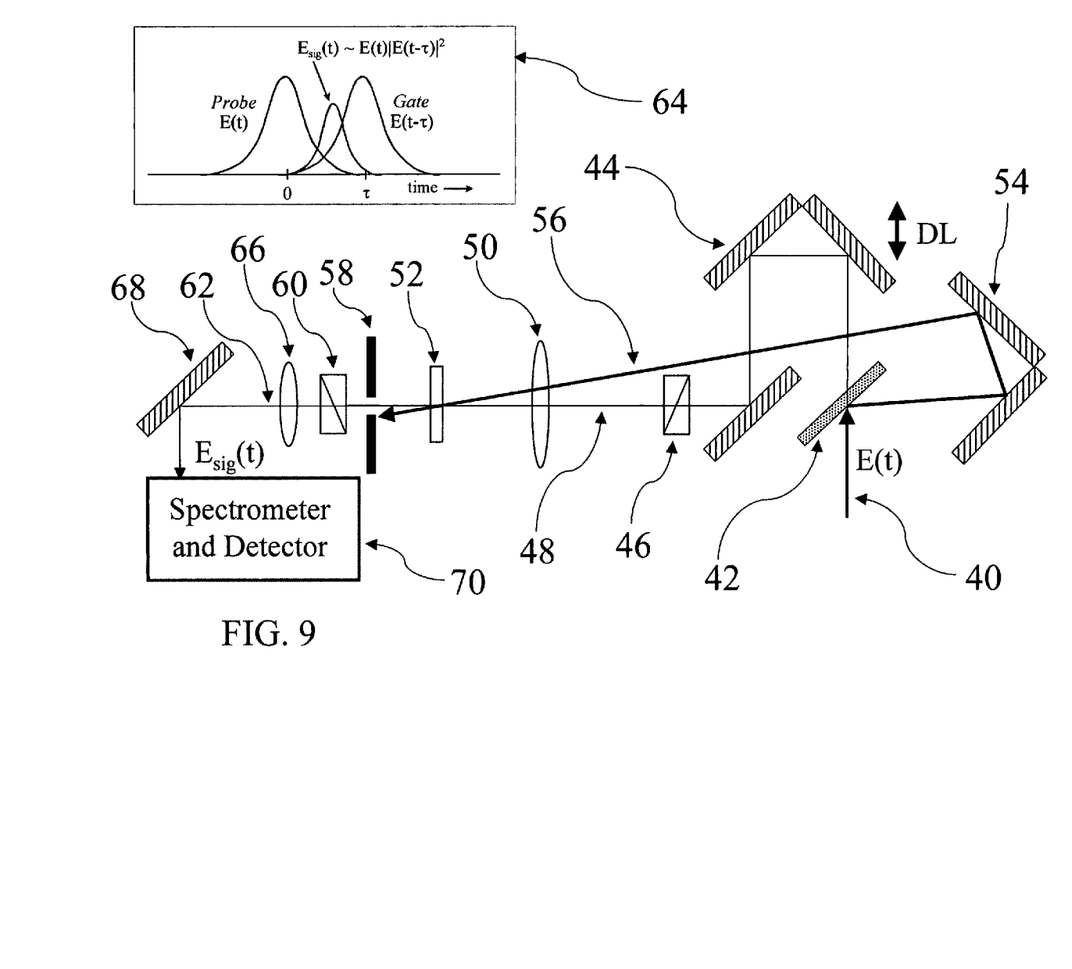
FIG. 9 illustrates the optical path for an exemplary polarization gate FROG device that could be used in the FROG system of FIG. 7.

FIG. 9 illustrates the optical path of a polarization gate FROG device that might be used in the FROG system 12 of FIG. 7. An ultrafast laser pulse 40 to be characterized is provided to the FROG device and is split by a beam splitter 42. A portion of the input pulse 40 passes through the beam splitter 42 and is directed by mirrors, including a scanning retroreflector 44 to provide the optical delay, through a first polarizer 46, which polarizes the probe portion 48 of the pulse. A spherical lens 50 focuses the polarized portion 48 of the pulse onto a non-linear medium 52. Typically the non-linear medium 52 is quartz. Mirror 54 directs the portion of the input pulse 40 that is split off and reflected from the beam splitter along an optical path so that lens 50 focuses this gate portion of the pulse 56 onto the non-linear medium 52.

Two resulting pulses 48, 56 form the probe and time delayed gate pulses that are combined by the non-linear medium 52. The gate pulse 56 produces a birefringence in the nonlinear material 52, which causes the polarization of the probe pulse 48 to rotate slightly allowing the signal pulse 62 to pass through polarizer 60 that is crossed relative to the input polarizer 46. A spatial filter 58 and the polarizer 60 remove unwanted portions of the initial pulses to produce the signal pulse 62 shown conceptually in the inset 64. The inset 64 shows the temporal relation between the probe, signal and gate pulses, as well. Lens 66 and mirror 68 direct the signal pulse 62 into the spectrometer and detector 70 that produces the two-dimensional spectrogram of the signal pulse. The spectrometer and detector 70 capture temporal slices of the spectrogram as the optical delay 44 is moved for phase retrieval processing as discussed above.

Figure 10:
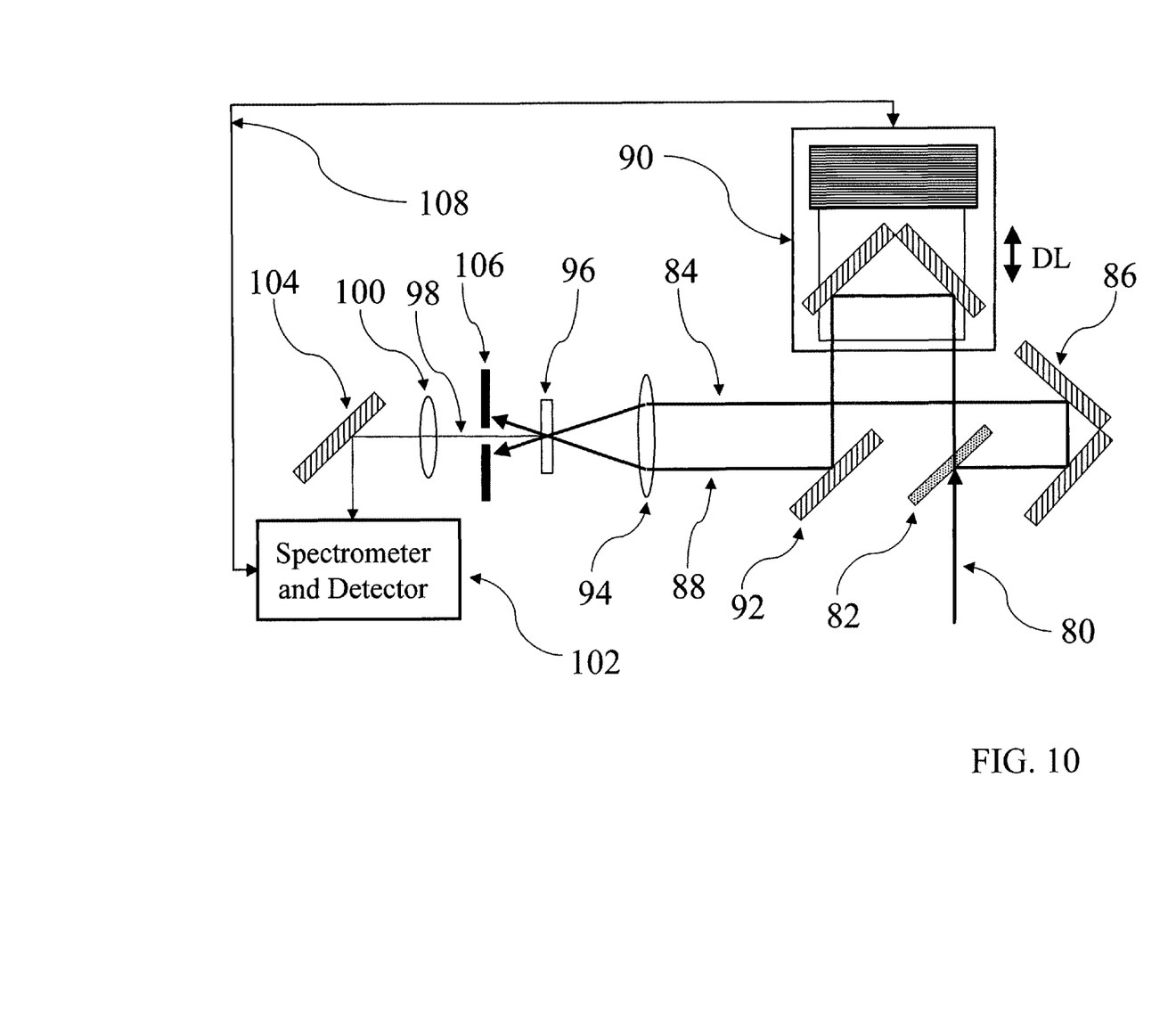
FIG. 10 is a schematic illustration of a FROG system in accordance with aspects of the present invention, which includes a voice coil servo stage that produces the scanning delay. While the FROG geometry shown is SHG FROG, any FROG geometry can be implemented as well.

FIG. 10 illustrates the optical path of a second harmonic generation (SHG) FROG device that might be used in the FROG system 12 of FIG. 7. An input pulse 80 enters the second harmonic generation FROG device and is split into two replicas by a beam splitter 82. One pulse, which is deemed the gate pulse 84, is retro reflected by two mirrors 86. The other replica, the probe pulse 88 is sent to a voice coil servo controlled optical delay 90. A mirror 92 directs the probe pulse 88 through a spherical lens 94 that focuses both the probe pulse 88 and the gate pulse 84 into a nonlinear crystal 96 suitable for second harmonic generation. The probe pulse 88 and the gate pulse 84 sum in the nonlinear crystal 96 to produce the signal pulse 98. A spherical lens 100 images the signal pulse 98 onto the slits of a spectrometer 102. An optional mirror 104 helps to direct the signal pulse 98 into the spectrometer 102. An iris 106 prevents any stray second harmonic light generated by the probe and gate pulses from entering the spectrometer 102 and corrupting the signal pulse 98. The detector records the spectra as a function of delay to produce the FROG trace, which is subjected to phase retrieval processing as discussed above.

An important problem with FROG retrievals is the deleterious effect noise in the wings of the measured FROG trace can have on the retrieved pulse. Such noise can cause artifacts in the retrieved pulse and can lower the dynamic range of the measurement. While these artifacts are most noticeable in the wings of the pulse, where the pulse intensity is small, these background-induced artifacts occur randomly anywhere on the pulse.

To first order, the background can be removed by determining the background in the wings of the FROG trace. This can be accomplished by moving the delay line to such a large delay that no FROG trace data will be present. Alternatively, the input beam could be blocked. The resulting background can be subtracted from the entire trace. However, noise in the background measurement is still present and can be quite large in less expensive array detectors. This noise can still cause significant problems for the FROG measurement.

An effective way to mitigate the effects of noise is to filter the FROG trace. Generally this filtering is done in the computer 16 (FIG. 7) prior to phase retrieval processing, but it is possible to implement the filtering in different ways including within the spectrometer. One useful type of filter that can be used to remove speckle noise in the wings of the FROG trace is the median filter. A median filter works by replacing the center of a small sub-region of the image by the median of the values in the sub-region. This is accomplished by ordering the values in a small (N×N) sub-region of an image or matrix from lowest to highest (or vice versa). If N is an odd number, the total number of points is odd, and the middle value in the ordered sequence is by definition the median value. The sub-region is moved over the entire image so that every point of the image is filtered. If the center point of the sub-region is on the edge of the matrix or image, then wrapping the image using points from opposite sides of the matrix for the filtering can fill in points in the sub-region. Alternatively, fixed values, such as zero, can be added to the sides of the image to fill the sub-region when it is on the edge of the image.

Another type of filter that can be used is a rank filter. Rather than choose the median, or middle value, of an N×N sub-region of the image, a value with lower or higher rank is chosen, such as the lowest value, the next to lowest value, the highest value, etc. In addition, a modification of the rank filter determines if the center point of the sub-region is closer to the lowest or highest value in the sub-region. If the point is closer to the highest value, it is replaced by the higher value. Alternatively, if it is closer to the lowest value, it is replaced by the lowest value:

For purposes of filtering FROG traces, it is often best to make the rank filter adaptive by applying the rank filter for only certain values of the FROG trace. Most often, the FROG trace needs to be filtered by a rank filter when the values are low. When the rank filter is made adaptive in this manner, it requires two numbers to be specified: the rank and the threshold. If the sum of the values in the sub-region is greater than the threshold, nothing is done. Conversely, if the sum of the values in the sub-region is less than the threshold, the center value of the sub-region is replaced by the value with the appropriate rank. Preferably, the use of any of these filter functions is selectable by the user through the user interface of the computer.

Real time as it is used in this application means a rate of at least one Hertz. Rates of three Hertz or faster are more preferred real time implementations to provide a useful rate of update.

Useful information is not just limited to the frequency domain, or spectral phase of the pulse. Time domain phase can be used to determine spectral loss of the pulse due to clipping of the beam within the stretcher-compressor.

This device may be used for measuring light pulses in telecommunications systems as well.

Although the present invention has been described in detail with reference only to the presently preferred embodiments, those of ordinary skill in the art will appreciate that various modifications can be made without departing from the invention. Accordingly, the invention is not to be limited to any of the described embodiments thereof but is instead defined by the following claims.

What is claimed is:

1. A method for real-time measurement of ultrashort laser pulses comprising:
   using a servo controlled delay stage that incorporates a high accuracy position encoder into its control, the servo controlled delay stage comprising a voice coil positioner coupled to the high accuracy position encoder and operative to set a delay along a signal path, where the servo controlled delay stage has high enough accuracy to measure pulses as short as ten femtoseconds;
   recording in a computer measured frequency resolved optical gating (FROG) trace data, the FROG trace data generated by processing a pulse responsive to the delay in a FROG device;
   processing the measured FROG trace to perform real time phase retrieval and generating in real time a retrieved pulse from the measured FROG trace; and
   displaying the retrieved pulse.

2. The method of claim 1 further comprising providing feedback to the user regarding performance of the delay.

3. The method of claim 2 where the feedback to the user is the FROG trace error.

4. The method of claim 2 where the feedback to the user is comparing the measured and retrieved FROG trace.

5. The method of claim 1 where the high accuracy position encoder is a position sensitive detector.

6. The method of claim 5 where the position sensitive detector is an optical position sensitive detector.

7. The method of claim 1, further comprising filtering the measured FROG trace to reduce a magnitude of artifacts in the measured FROG trace prior to the real time phase retrieval processing.

8. The method of claim 1 where accuracy of the high accuracy position encoder is better than a center wavelength of light of the pulse being measured.

9. The method of claim 1 where the high accuracy position encoder is directly coupled into a feedback loop of the servo drive.

10. The method of claim 1 where the high accuracy encoder is linearized.

11. The method of claim 1 further comprising interpolating to obtain the FROG trace data.

12. The method of claim 1 further comprising synchronizing the servo and collecting the FROG trace data.

13. A method of claim 1 where the servo utilizes step scan acquisition.

14. A method of performing real time phase retrieval processing of frequency resolved optical gating (FROG) traces, the method comprising:

receiving as input a measured FROG trace data set, the FROG trace data set generated by processing a pulse in a FROG device;

the FROG device using a servo optical delay that incorporates a high accuracy optically-based position sensor, the servo optical delay comprising a voice coil positioner coupled to the high accuracy optically-based position sensor and operative to provide a delay along an optical path, where the servo optical delay has high enough accuracy to measure pulses as short as ten femtoseconds, the pulse responsive to the delay;

processing the measured FROG trace data set to perform real time phase retrieval and generating in real time a retrieved pulse from the measured FROG trace; and generating displays of the retrieved pulse at a rate of one Hertz or faster.

15. The method of claim 14 where accuracy of the high accuracy optically-based position encoder is better than a center wavelength of light of the pulse being measured.

16. A method of performing real time phase retrieval processing of frequency resolved optical gating (FROG) traces, the method comprising:

receiving as input a measured FROG trace data set, the FROG trace data set generated by processing a pulse in a FROG device;

the FROG device using a servo optical delay that incorporates an optically-based position sensor, where accuracy of the optically-based position encoder is better than a center wavelength of light of the pulse being measured, the servo optical delay comprising a voice coil translator coupled to the optically-based position sensor and operative to provide a delay, the pulse responsive to the delay;

processing the measured FROG trace data set to perform real time phase retrieval and generating in real time a retrieved pulse from the measured FROG trace; and generating in real time a display of the retrieved pulse.

17. The method of claim 16 where the servo is accurate enough to measure ten femtosecond pulses.

* * * * *